Patented Sept. 26, 1933

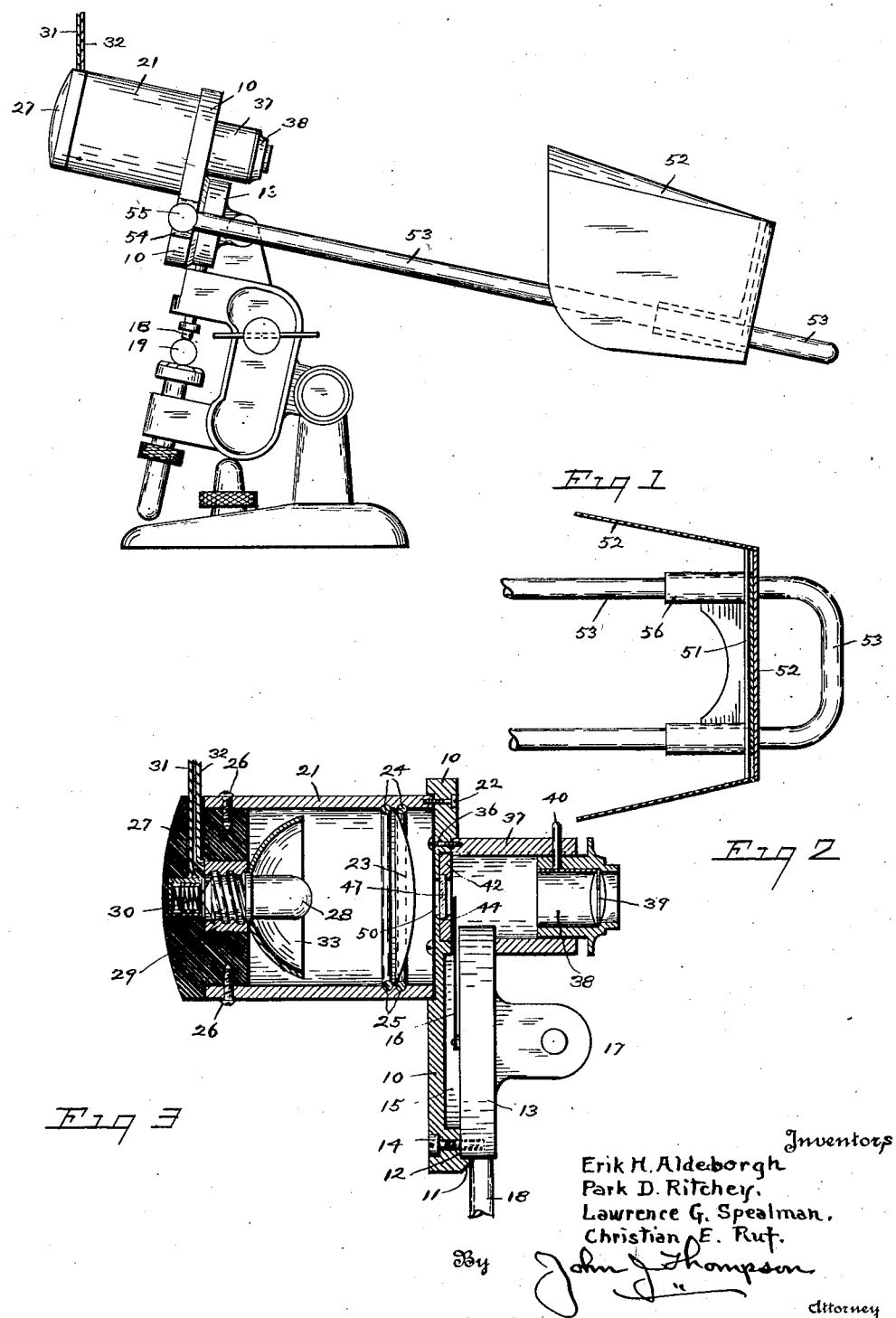

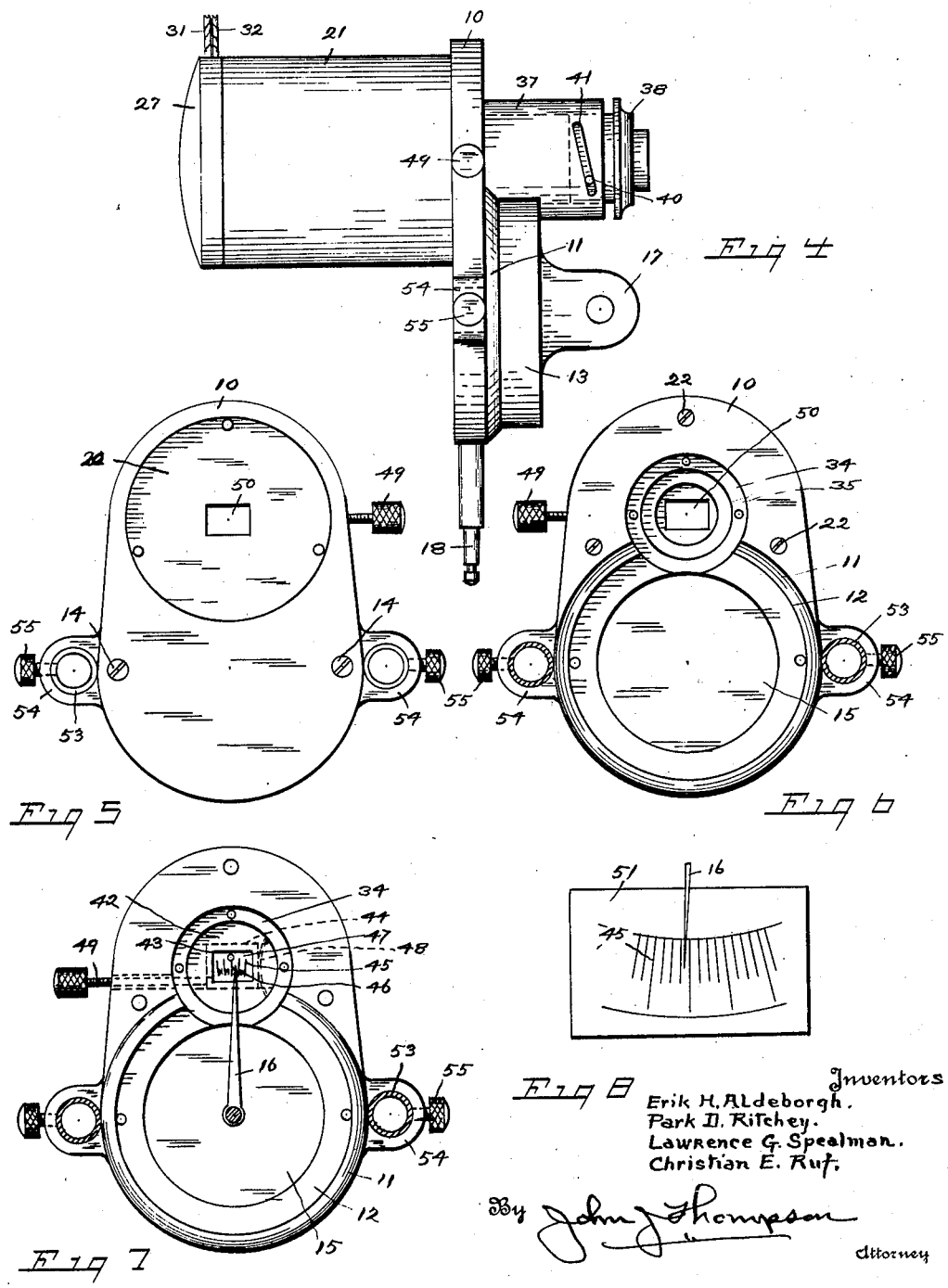

1,928,001

UNITED STATES PATENT OFFICE 1,928,001

PROJECTION INDICATOR MEASURING INSTRUMENT

Erik H. Aldeborgh, Park D. Ritchey, Lawrence G. Spealman, and Christian E. Ruf, Poughkeepsie, N. Y., assignors to Standard Gage Company, Inc., Poughkeepsie, N. Y., a corporation of New York Application September 15, 1931
Serial No. 562,840

9 Claims. (Cl. 88—24)

This invention relates to an instrument for the accurate measurement of very fine dimensions which could not be seen with ease by the naked eye without producing a strain on the eyes of the operator.

The object of the invention is to provide an instrument in the form of an attachment that may be readily attached to comparator gauges, and within which a standard dial indicator may be employed.

Another object of the invention is to provide an instrument which will operate on a small electric current, have adjustments as to the size of the projected image, as well as adjustment of the image with regard to the dial indicator pointer and adjustment of the focus to sharpen the picture.

A still further object being to provide an instrument for fine accurate measurement by the action of a projected light beam, magnified upon a screen, whereby measurements of any degree of fineness may be seen with ease by the operator and in the gauging of production work, great speed of operation may be attained.

In the drawings:—

Figure 1 is a side elevation of the device, showing the same as attached to a comparator gauge.

Figure 2 is a partial detail plan view in section of the hood and supporting rods.

Figure 3 is an enlarged detail sectional view of the device, showing the construction and arrangement of the parts.

Figure 4 shows a side elevation of the device without the hood and supporting rods.

Figure 5 is a detailed front view of the mounting plate with the light chamber removed.

Figure 6 is a detailed rear view of the mounting plate with the projector and dial indicator removed.

Figure 7 is a detailed rear view of the mounting plate with the projection plate in place, and showing the means for adjusting the same and the pointer of the dial indicator.

Figure 8 is a view of the screen, showing the enlarged projected image from the projector.

Referring to the drawings:—

The device comprises a mounting plate 10, which is formed with a circular beading 11 on the rear side, and recessed as at 12 to receive the body of a dial indicator 13 to which it is secured by the screws 14; said recess being enlarged as at 15 to receive the pointer or hand 16 of the indicator and allow of its free movement.

The instrument is mounted upon a comparative gauge or other support or tool, by the dial indicator 13 in the usual manner, by its ear 17, so that the plunger 18 may contact with the work 19 in the proper manner.

The front of the mounting plate 10 is formed with a recessed portion, parallel to the recess 12, but off center from the same, and within this recess 20 is mounted the front end of the light chamber 21, by the securing screws 22.

This lighting chamber is formed of tubing, and has a light projecting lens 23 mounted within the same near its rear end, by a pair of spring rings 24 which are sprung into grooves 25 formed in the wall of said tube 21; while the other end of said chamber has secured therein by the screw 26 a plug 27 of insulating material, within the center of which is mounted a lamp 28 in a socket 29 and provided with a contact 30; both of which are supplied with the proper low current by the lead wires 31 and 32 from a source of power and controlled by a suitable switch; the bulb or lamp 28 is supplied with a reflector 33.

In axial relation to the recess 20 the mounting plate 10 is formed on the front side with two concentric recesses or circular depressions 34 and 35, and within the recess 34 is mounted and retained by the screws 36, the rear end of the projector 37, the lower part of which is cut away to accommodate the upper part of the dial indicator body 13 and the pointer 16.

In the front end of said projector 37 is mounted in an adjustable manner the lens holder 38 within which is secured the projecting lens 39; the adjustment being effected by a pin 40 secured in the lens holder 38 and projecting through an inclined slot 41 formed in the wall of the projector 37, so that by turning the pin 40 from side to side the lens holder will be moved in or out for the projector and the distance between the projecting lens 23 and the magnifying lens 39 to vary the focus to sharpen the image in the screen.

In the recess 35 is mounted a circular frame 42 which is formed with a rectangular orifice 43 and a guide way 44; while within the guideway 44 is mounted in an adjustable manner a projection plate of transparent material such as glass, on which is marked the portion of a dial having the division lines 45 and the sub-division lines 46 of any desired measurement such as 10.0000 between the division lines making the sub-divisions one tenth of one one thousandth of one inch, or any finer measurement that may be desired.

For the purpose of adjusting this image plate 47 so that in setting the instrument the zero mark may be brought in registry with the pointer 16, one end of the plate 47 is in contact with a spring 48 set in the plate frame 42, and the mounting plate 10 is provided with a threaded pin 49 threaded therein, with its end in contact with the side edge of the image plate 47 and adapted to force the same against the action of the spring 48 and slightly move the image plate 47 in the groove or guideway 44.

The mounting plate 10 is also formed with a window 50 in registry with the rectangular orifice 43 in the frame 42 so that the image plate 47 is held between the mounting plate 10 and the frame 42 in such a manner that the pointer 16 moves across the face thereof and its image in relation to the graduations on the image plate 47 will be projected on the screen.

The projection screen is composed of a white material such as cardboard 51 and is retained in a hood 52 which is formed with flaring sides and top and secured upon a carriage 56 which is slidably mounted on a pair of supporting rods 53 which have their ends secured in the bosses 54 which are formed on the mounting plate 10 and secured by the screws 55, and by sliding the carriage upon the rods the size of the projected image is controlled on the screen.

Having thus described our invention, what we claim as new and desire to secure by Letters Patent, is—

1. A light projection measuring instrument, comprising in combination with an indicator having a movable pointer, of a mounting plate secured to said indicator and formed with a window in the body thereof, a transparent dial adjustably mounted adjacent said window, graduations formed on said dial and in the path of travel of the pointer, a light projecting means secured to the rear of said mounting plate in concentric relation with said window, an image magnifying means secured to the front of said mounting plate concentric with said light projecting means, said window and said light projecting means, means for adjusting the focus of said magnifying means, and an adjustable screen located in the path of light from said magnifying means and adapted to receive the enlarged image of the graduations and pointer thereon.

2. A light operated projection indicator, comprising in combination with an indicator having a pointer, of a transparent dial having graduation marks thereon and mounted adjacent said pointer, means for adjusting said dial to center the same, a screen mounted adjacent said dial, means for adjusting the distance between said dial and said screen, and means for projecting the graduations and the position of the pointer in relation thereto upon said screen.

3. A light projection measuring instrument, comprising in combination with an indicator having a pointer, of a transparent dial having graduations thereon and mounted in the path of travel of said pointer, means for adjusting the transverse position of said dial, a screen and means for varying the distance between said screen and the dial, means for projecting the graduations on the position of the pointer thereto upon said screen in an enlarged state.

4. A light projection measuring instrument, comprising in combination with an indicator having a movable pointer, of a transparent dial mounted adjacent said pointer, means for adjusting the transverse position of said dial with respect to the pointer, graduations carried by said dial, a light projecting means located at one side of said dial, a magnifying means located upon the other side of said dial, a screen located in the path of light from said projection means, means for adjusting the position of said screen with respect to said dial to clarify the image cast thereon by the pointer and graduations of the dial.

5. A light projection measuring instrument, comprising in combination with an indicator having a movable pointer, of a transparent dial mounted adjacent said pointer, means for adjusting the position of said dial with relation to the pointer, a light projecting means mounted adjacent said dial for projecting light through the same, a magnifying lens located in the path of said light and to at the opposite side from said dial, means for adjusting said magnifying lens to focus the same, a screen located in the path of light from said projecting means for receiving the enlarged image thereon, and means for adjusting the screen with respect to the dial.

6. An instrument for the measurement of dimensions by the employment of projected and magnified light rays, of a gaging means having a movable pointer, a graduated transparent scale mounted in the path of and adjacent to said pointer, means for adjusting the position of said scale to register with said dial, a light projector mounted to the rear of said scale and adapted to illuminate the same, a magnifying lens mounted in front of said scale and concentric therewith, a screen mounted in spaced relation with said scale, means for varying the distance between said screen and said scale for clarifying the image thereon.

7. In an instrument for the measurement of diameters by the projection and magnification of light rays, of a light projecting means, a magnifying means and a screen all mounted in concentric relation with each other, a graduated transparent scale mounted between the light projecting means and the screen, means for adjusting the same, and a measuring indicator having a movable hand adapted to be moved across the face of said scale in close relation thereto and within the path of light to indicate upon said screen the relative position of said hand to said graduations.

8. In an instrument for the measurement of dimensions by the projection of light rays, of a light projecting means, a screen to receive the projected image, a transparent scale mounted between the light projecting means and the screen, means for adjusting the transverse position of said scale, a measuring means having a pointer mounted adjacent said scale and adapted to move across said scale in measuring relation with the graduations on said scale.

9. In an instrument for measuring dimensions by the projection of light rays, of a light projecting means, a graduated transparent scale adjacent thereto and in the path of light therefrom, means for adjusting the position of said scale, a measuring means having a hand adjacent said scale, and a screen spaced from said scale and means for adjusting the spacing thereof.

ERIK H. ALDEBORGH.
PARK D. RITCHEY.
LAWRENCE G. SPEALMAN.
CHRISTIAN E. RUF.